US009584628B2

(12) United States Patent
Pathak et al.

(10) Patent No.: US 9,584,628 B2
(45) Date of Patent: Feb. 28, 2017

(54) ZERO-COPY DATA TRANSMISSION SYSTEM

(71) Applicants: Arun Pathak, Patiala (IN); Hemant Agrawal, New Delhi (IN); Sahil Malhotra, Jalandhar (IN)

(72) Inventors: Arun Pathak, Patiala (IN); Hemant Agrawal, New Delhi (IN); Sahil Malhotra, Jalandhar (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 245 days.

(21) Appl. No.: 14/660,934

(22) Filed: Mar. 17, 2015

(65) Prior Publication Data

US 2016/0275042 A1 Sep. 22, 2016

(51) Int. Cl.
*H04L 29/06* (2006.01)
*G06F 9/54* (2006.01)

(52) U.S. Cl.
CPC .............. *H04L 67/42* (2013.01); *G06F 9/54* (2013.01)

(58) Field of Classification Search
CPC ...................................................... H04L 67/42
USPC ........................................................ 709/212
See application file for complete search history.

(56) References Cited

U.S. PATENT DOCUMENTS

| | | | | |
|---|---|---|---|---|
| 5,319,760 A | * | 6/1994 | Mason | G06F 12/1036 711/208 |
| 5,860,141 A | * | 1/1999 | Washington | G06F 12/0292 711/1 |
| 5,999,743 A | * | 12/1999 | Horan | G06F 3/14 709/247 |
| 7,003,586 B1 | * | 2/2006 | Bailey | G06F 12/1009 709/250 |
| 7,451,456 B2 | | 11/2008 | Andjelic | |
| 7,577,761 B2 | | 8/2009 | Boyd | |
| 8,416,768 B2 | | 4/2013 | Aloni et al. | |
| 8,489,761 B2 | * | 7/2013 | Pope | H04L 69/16 709/236 |
| 8,713,180 B2 | * | 4/2014 | Bakke | H04L 69/16 709/226 |
| 8,745,235 B2 | * | 6/2014 | Keilhau | G06F 9/544 709/226 |

(Continued)

OTHER PUBLICATIONS

Blumrich et al., "Virtual-Memory-Mapped Network Interfaces", 1995.*

(Continued)

*Primary Examiner* — O. C. Vostal
(74) *Attorney, Agent, or Firm* — Charles E. Bergere

(57) ABSTRACT

A data transmission system for transmitting a data file from a server to a client device includes a processor, a memory and a network interface device. The memory includes a user space and a kernel space. The data file is stored in the kernel space. The processor receives a transmission request from the client device for transmitting the data file. The processor maps a set of virtual addresses corresponding to the data file to the user space as a mapped data file, and stores a set of physical addresses corresponding to the set of virtual addresses in a set of meta-buffers of a socket created in the user space. The network interface device retrieves the data file from the kernel space based on the set of physical addresses from the set of meta-buffers, and transmits the data file to the client device.

17 Claims, 6 Drawing Sheets

(56) References Cited

U.S. PATENT DOCUMENTS

| | | | | |
|---|---|---|---|---|
| 9,134,954 B2* | 9/2015 | Sharp | G06F 5/14 |
| 9,354,977 B1* | 5/2016 | Backensto | G06F 11/1448 |
| 2004/0153672 A1* | 8/2004 | Watt | G06F 9/3012 | 726/22 |
| 2005/0038941 A1* | 2/2005 | Chadalapaka | G06F 12/1081 | 710/52 |
| 2007/0118712 A1* | 5/2007 | van Riel | G06F 12/023 | 711/170 |
| 2007/0294496 A1* | 12/2007 | Goss | G06F 12/1408 | 711/163 |
| 2008/0005297 A1* | 1/2008 | Kjos | G06F 12/1081 | 709/223 |
| 2011/0161620 A1* | 6/2011 | Kaminski | G06F 12/1009 | 711/207 |
| 2015/0020075 A1* | 1/2015 | Glew | G06F 9/4881 | 718/101 |
| 2015/0100791 A1* | 4/2015 | Chen | G06F 12/1408 | 713/189 |
| 2015/0378762 A1* | 12/2015 | Saladi | H04L 41/0816 | 718/1 |

OTHER PUBLICATIONS

Chase, "Zero-Copy Sockets", 1999.*
Chu, "Zero-Copy TCP in Solaris", 1996.*
Clements et al., "Scalable Address Spaces Using RCU Balanced Trees", 2012.*
Cranor et al., "Zero-Copy Data Movement Mechanisms for UVM", 1999.*
Dalessandro et al., "Memory Management Strategies for Data Serving with RDMA", 2007.*
Engler et al., "Exokernel: An Operating System Architecture for Application-Level Resource Management", 1995.*
FreeBSD, "sendfile—send a file to a socket", "FreeBSD System Calls Manual", 2010.*
FreeBSD, "zero_copy, zero_copy_sockets—zero copy sockets code", "FreeBSD Kernel Developer's Manual", 2012.*
Gallatin et al., "Trapeze/IP: TCP/IP at Near-Gigabit Speeds", 1999.*
Greenman et al., "FreeBSD/Linux Kernel Cross Reference", 1994.*
Huang et al., "Accelerate In-Line Packet Processing Using Fast Queue", 2010.*
Kivity et al., "kvm: the Linux Virtual Machine Monitor", 2007.*
Li et al., "LyraNET: A Zero-Copy TCP/IP Protocol Stack for Embedded Operating Systems", 2005.*
Linux, "sendfile—transfer data between file descriptors", "Linux Programmer's Manual", 2016.*
Menon et al., "Optimizing Network Virtualization in Xen", 2002.*
Navarro et al., "Practical, transparent operation system support for superpages", 2002.*
Rizzo, "netmap: a novel framework for fast packet I/O", 2012.*
Song et al., "Performance Review of Zero Copy Techniques", 2012.*
Stancevic, "Zero Cpy I: User-Mode Perspective", 2003.*
White et al., "QuickStore: A High Performance Mapped Object Store", 1995.*
Willmann et al., "Protection Strategies for Direct Access to Virtualized I/O Devices", 2008.*
Jia Song, Jim Alves-Foss, "Performance Review of Zero Copy Techniques", International Journal of Computer Science and Security (IJCSS), vol. 6, Issue 4, 2012, pp. 256-268.

* cited by examiner

ZERO-COPY DATA TRANSMISSION SYSTEM

BACKGROUND OF THE INVENTION

The present invention generally relates to computer networks, and, more particularly, to a data transmission system in a computer network.

A computer network is a group of computing devices interconnected by a transmission medium. The computer network facilitates exchange of information between the computing devices. The computer network includes two types of the computing devices, namely, client devices and servers. Servers contain multiple resources that are shared with other computing devices in the computer network, such as data files that store information that is exchanged between the computing devices. The client devices access the resources provided by the servers.

A server has a memory that stores data files to be transmitted and boot code for booting a server operating system (OS), examples of which include Linux©, Windows©, and Macintosh© OSs. The memory includes multiple physical addresses at which the data files and the boot code are stored. For example, the boot code may be stored in a secure partition of the memory that cannot be overwritten. The server also includes a processor that retrieves the boot code from the memory and then executes it.

The server OS enables execution of multiple user processes. These user processes provide multiple services to a client device connected to the server, such as a file transfer service for transmitting data files, e-mail, and a web browser. The server OS further enables execution of a kernel that acts as an interface between the user processes and the processor and the memory, where the processor controls access of the user processes to the memory by way of the kernel.

To provide access to the physical addresses of the memory, the server OS utilizes a virtual address space that includes multiple virtual addresses that correspond to the physical addresses. To protect data files from malicious programs that may affect user processes and to provide fault tolerance during processing, the virtual address space is divided into two spaces, a kernel space that includes a first set of virtual addresses, and a user space that includes a second set of virtual addresses. The data files are stored at the physical addresses corresponding to the kernel space. The kernel space is reserved for kernel services and system calls generated by the kernel. The user space is reserved for user processes. The user processes request a kernel service using a system call. When the processor executes a system call, the processor is in a kernel mode. When the processor executes user processes, the processor is in a user mode. Therefore, when user processes such as file transfer services are executed, the data files are transmitted from the kernel space of the server to the client device via the computer network.

FIG. 1A illustrates a schematic block diagram of a conventional server 102 for transmitting a data file to a client device (not shown) in a computer network (not shown) by generating read and write system calls. The server 102 includes a processor 104, a memory 106, and a network interface device 108. The processor 104 includes a system memory 110, and the network interface device 108 includes a direct memory access (DMA) system 112. The memory 106 has a user space 114 and a kernel space 116. The kernel space 116 includes a kernel buffer 118 and a socket 120, and the user space 114 includes a user buffer 122.

The processor 104, the memory 106, and the network interface device 108 are interconnected with a system bus (not shown). The DMA system 112 is connected to the client device via the computer network for transmitting the data file.

Initially, the processor 104 operates in a user mode and executes a file transfer service, where the server 102 receives a transmission request from the client device. In response, the processor 104 identifies the data file stored in a secondary memory (not shown) of the server 102, retrieves the data file from the secondary memory, and stores the data file in to the kernel buffer 118. Subsequently, the file transfer service generates a read system call. The processor 104 then transitions from the user mode to the kernel mode to execute the read system call. The processor 104 copies the content of the kernel buffer 118 to the user buffer 122 based on the read system call. The processor 104 then transitions from the kernel mode and to the user mode. To initiate transmission of the data file by way of the DMA system 112, the file transfer service generates a write system call to store the data file in the socket 120. The processor 104 then transitions from the user mode to the kernel mode to execute the write system call. The processor 104 copies the content of the user buffer 122 to the socket 120 based on the write system call. The DMA system 112 retrieves the data file from the socket 120 and transmits it to the client device via the computer network.

FIG. 1B illustrates transitions of the processor 104 between the user and kernel modes when the processor 104 generates read and write system calls. Here, the processor 104 undergoes transitions between the user and kernel modes four times during the transmission of the data file by executing read and write system calls.

FIG. 2A is a schematic block diagram of another conventional server 202 that can transmit a data file to a client device (not shown) in a computer network (not shown) using a SENDFILE system call. The server 202 includes a processor 204, a memory 206, and a network interface device 208. The processor 204 includes a system memory 210. The network interface device 208 includes a direct memory access (DMA) system 212. The memory 106 has a user space 214 and a kernel space 216, and the kernel space 216 includes a kernel buffer 218 and a socket 220.

The processor 204, the memory 206, and the network interface device 208 are interconnected by a system bus (not shown). The DMA system 212 is connected to the client device via the computer network for transmitting the data file.

Initially, the processor 204 operates in a user mode and executes a file transfer service. The server 202 receives a transmission request from the client device via the computer network for transmitting the data file. In response, the processor 204 identifies the data file stored in a secondary memory (not shown) of the server 202, retrieves the data file from the secondary memory, and stores it in the kernel buffer 218. Subsequently, the file transfer service generates the SENDFILE system call. The processor 204 then transitions from the user mode to the kernel mode to execute the SENDFILE system call. The processor 204 copies the contents of the kernel buffer 218 to the socket 220 based on the SENDFILE system call, and then transitions from the kernel mode back to the user mode. The DMA system 212 retrieves the data file from the socket 220 and transmits it to the client device via the computer network.

FIG. 2B illustrates transitions of the processor 204 between the user and kernel modes when the processor 204 generates the SENDFILE system call. Here, the processor 204 undergoes transitions between the user and kernel modes just two times by using the SENDFILE system call.

FIG. 3A is a schematic block diagram of yet another conventional server 302 for transmitting a data file to a client device (not shown) in a computer network (not shown) by generating memory map and write system calls. The memory map system call is also referred to as an MMAP system call. The server 302 includes a processor 304, a memory 306, and a network interface device 308. The processor 304 includes a system memory 310. The network interface device 308 includes a direct memory access (DMA) system 312. The memory 306 includes a user space 314 and a kernel space 316, and the kernel space 316 includes a kernel buffer 318 and a socket 320, while the user space 314 has a user buffer 322.

The processor 304, memory 306, and network interface device 308 are interconnected with a system bus (not shown). The DMA system 312 is connected to the client device via the computer network.

Initially, the processor 304 operates in a user mode and executes a file transfer service, and the server 302 then receives a transmission request from the client device. In response to the transmission request, the processor 304 identifies the data file stored in a secondary memory (not shown) of the server 302, retrieves the data file from the secondary memory, and stores it in the kernel buffer 318. Subsequently, the file transfer service generates the MMAP system call. The processor 304 then transitions from the user mode to kernel mode to execute the MMAP system call. The processor 304 stores a set of virtual addresses corresponding to the data file in to the user buffer 322 based on the MMAP system call. The processor 304 then transitions from the kernel mode back to the user mode. To initiate transmission of the data file using the DMA system 312, the file transfer service generates a write system call to store the data file in the socket 320. The processor 304 then transitions from the user mode to the kernel mode to execute the write system call. The processor 304 copies the content of the user buffer 322 to the socket 320 based on the write system call, thereby storing the set of virtual addresses in the socket 320. The DMA system 312 receives the virtual addresses from the socket 320 and determines a set of corresponding physical addresses by referring to a translation look-aside buffer (TLB) (not shown) stored in the system memory 310. The TLB is a cache memory used to translate a virtual address into a corresponding physical address. The DMA system 312 then retrieves the data file from the kernel buffer 318 based on the set of physical addresses and transmits the data file to the client device via the computer network.

FIG. 3B illustrates transitions of the processor 304 between the user and kernel modes when the processor 304 generates the MMAP and write system calls. Here, the processor 304 undergoes four transitions between the user and kernel modes during the transmission of the data file by executing the MMAP and write system calls.

In the aforementioned conventional systems for transmitting the data file, one or more than one copies of the data file are created in the memory. A large number of server processing cycles are used for creating the data file copies within the server. The efficiency of the server is directly dependent on the number of processing cycles available for performing user processes. When the server uses a large number of processing cycles for creating data file copies, the number of processing cycles available for user processes is reduced, thereby resulting in reduced performance. Further, the data file copies consume large spaces in the memory. Since the server operates on a finite physical memory size, the large spaces occupied by the data file copies cause a reduction in the memory available for other user processes, thus also affecting server performance.

The above-described methods cause the processor to transition between the user and kernel modes multiple times. A large number of processing cycles are wasted by these transitions. The use of the TLB to execute the SENDFILE system call may result in a TLB miss, which is when a requested virtual address is not present in the TLB. Hence, the conventional data transmission systems discussed above suffer from inefficiency and it would be advantageous to have a more efficient data transmission system and/or one that requires less memory space.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figures 1A, 1B:
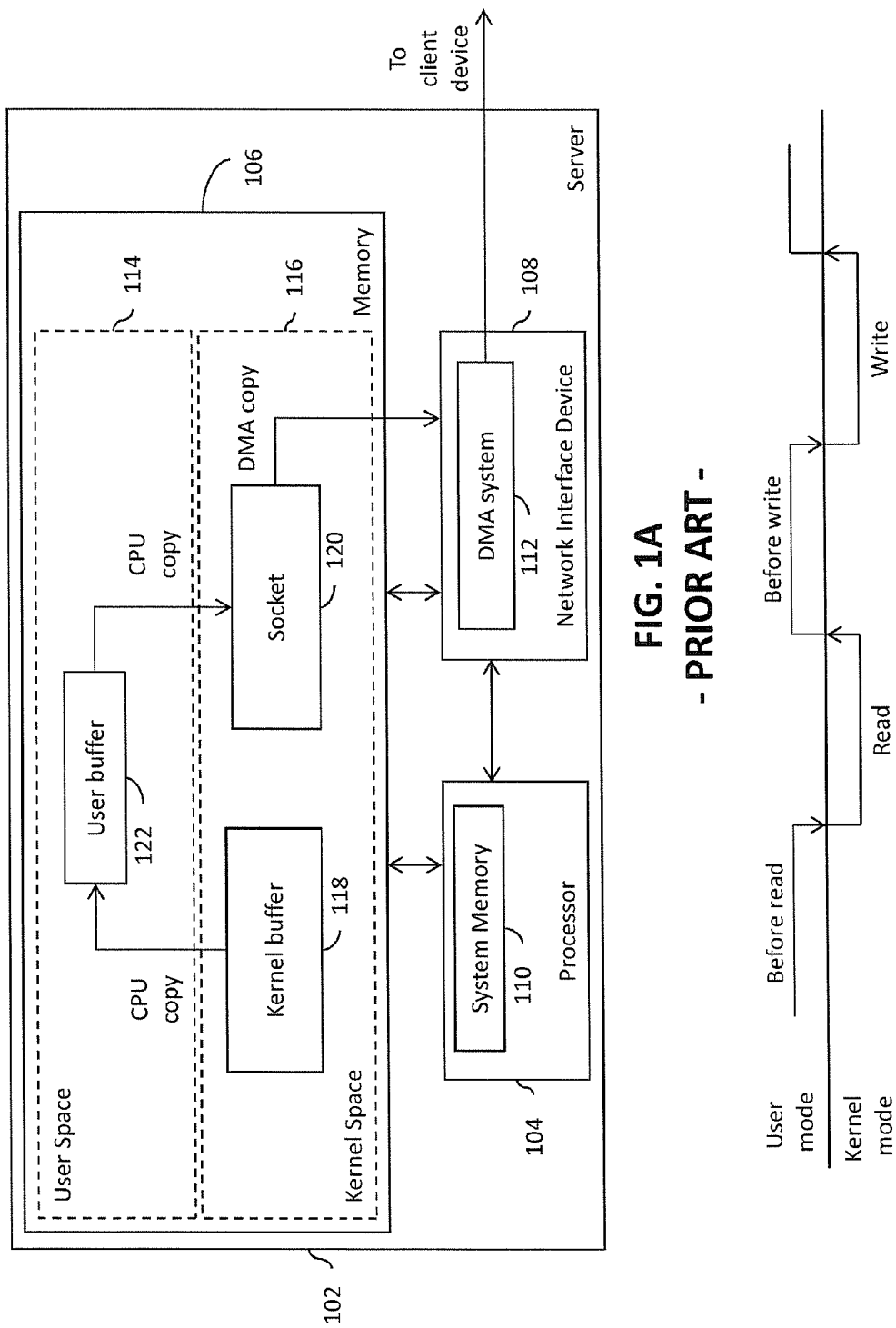
FIG. 1A is a schematic block diagram of a conventional server for transmitting a data file by generating read and write system calls.
FIG. 1B illustrates transitions of a processor of the conventional server of FIG. 1A between user and kernel modes.
Figures 2A, 2B:
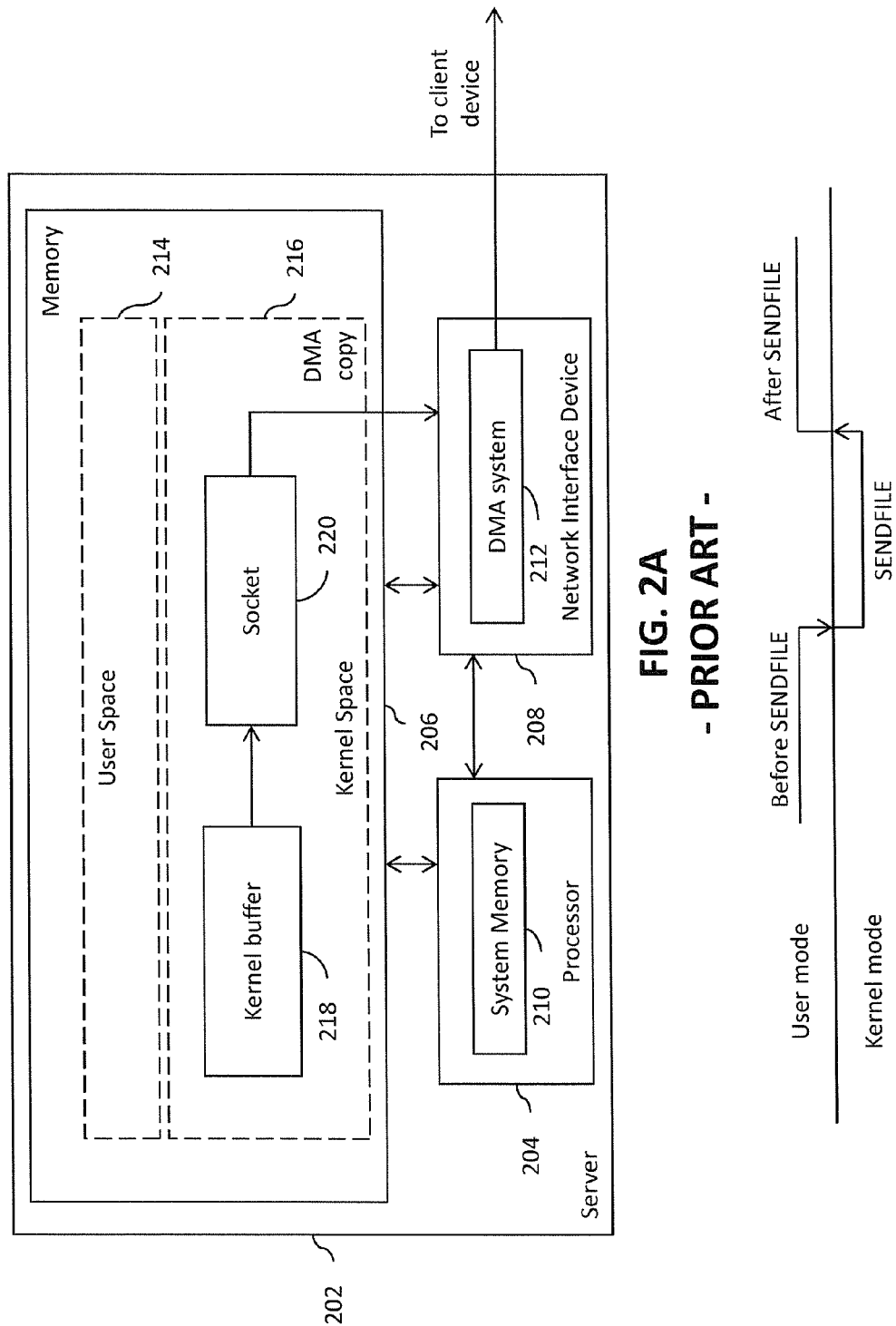
FIG. 2A is a schematic block diagram of another conventional server for transmitting a data file by generating a SENDFILE system call.
FIG. 2B illustrates transitions of a processor of the conventional server of FIG. 2A between user and kernel modes.
Figure 3A:
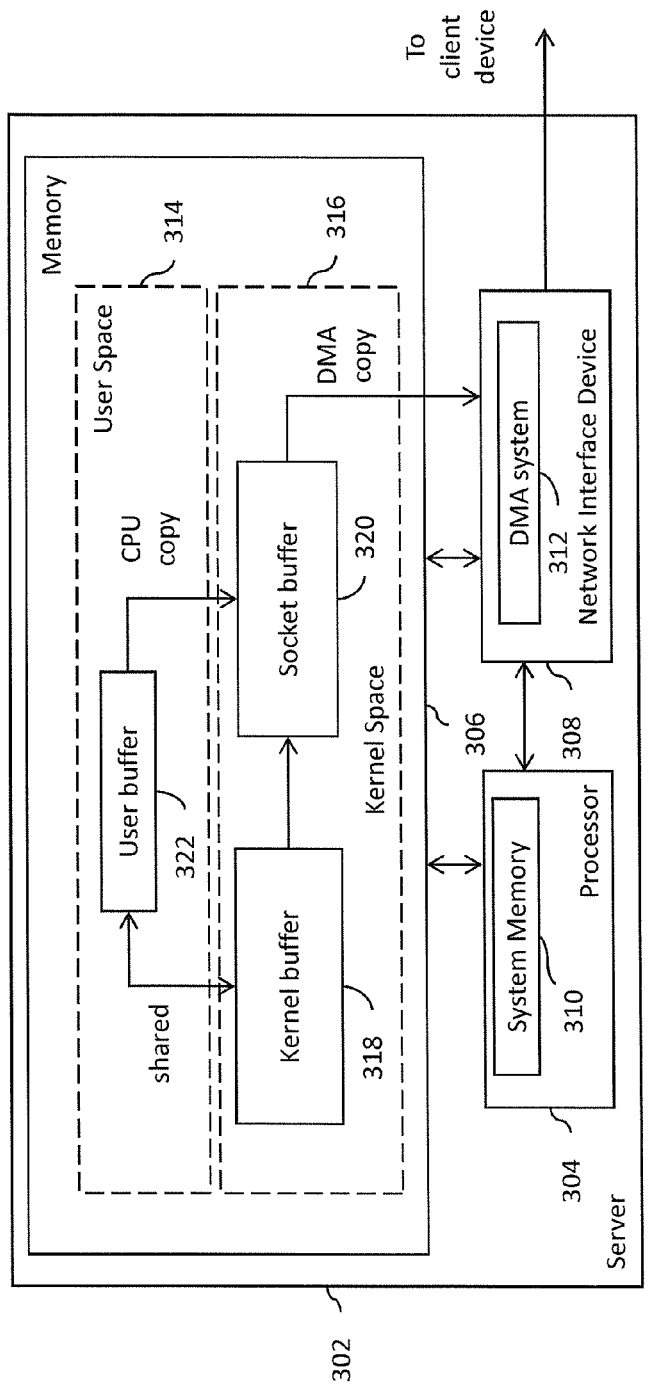
FIG. 3A is a schematic block diagram of yet another conventional server for transmitting a data file by generating MMAP and write system calls.
Figure 3B:
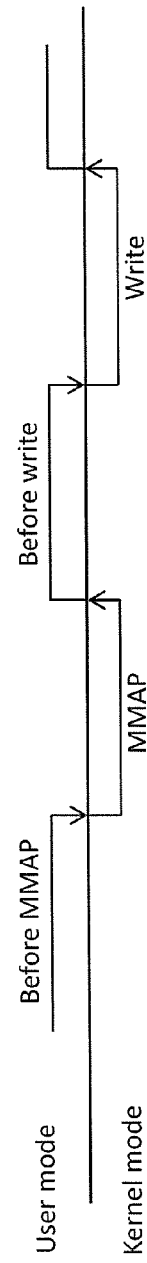
FIG. 3B illustrates transitions of a processor of the conventional server of FIG. 3A between user and kernel modes.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a data transmission system is provided. The data transmission system includes a memory, a processor, and a network interface device. The memory includes a plurality of memory locations having corresponding plurality of physical addresses associated therewith. The memory further includes kernel and user spaces. The kernel space stores a plurality of data files and a page table. The page table includes a mapping between a plurality of virtual addresses and corresponding plurality of physical addresses. The processor creates a socket in the user space. The socket includes a set of meta-buffers. The processor further receives a transmission request for transmitting a data file of the plurality of data files, maps a set of virtual addresses of the plurality of virtual addresses corresponding to the data file in to the user space as a mapped data file, retrieves a set of physical addresses of the plurality of physical addresses corresponding to the set of virtual addresses from the page table, and stores the set of physical addresses in to the set of meta-buffers. The network interface device retrieves the data file from the kernel space based on the set of physical addresses, and transmits the data file.

In another embodiment of the present invention, a method for transmitting a plurality of data files in a data transmission system that includes a memory, a processor, and a network interface device is provided. The memory includes a plurality of memory locations having a plurality of physical addresses associated therewith. The memory further includes a kernel space and a user space. The kernel space stores the plurality of data files and a page table. The method includes creating a socket in the user space. The socket includes a set of meta-buffers. A transmission request for transmitting a data file of the plurality of data files is received. A set of virtual addresses of a plurality of virtual addresses corresponding to the data file is mapped in to the user space as a mapped data file. The method further includes retrieving a set of physical addresses of the plurality of physical addresses corresponding to the set of virtual addresses from the page table. The page table includes a mapping between the plurality of virtual addresses and corresponding plurality of physical addresses. The set of physical addresses is stored in to the set of meta-buffers. The set of physical addresses is further retrieved from the set of meta-buffers. The data file is retrieved from the kernel space based on the set of physical addresses. The method further includes transmitting the data file.

Various embodiments of the present invention provide a data transmission system. The data transmission system includes a memory, a processor, and a network interface device. The memory includes a plurality of memory locations having corresponding plurality of physical addresses associated therewith. The memory further includes kernel and user spaces. The kernel space stores a plurality of data files and a page table. The page table includes a mapping between a plurality of virtual addresses and corresponding plurality of physical addresses. The user space includes a user space based network stack that includes a plurality of instructions for transmitting the data file. The processor is in a user mode when the processor communicates with the memory and executes the plurality of instructions. The processor creates a socket in the user space. The socket includes a set of meta-buffers. The processor further receives a transmission request for transmitting a data file of the plurality of data files, maps a set of virtual addresses of the plurality of virtual addresses corresponding to the data file in to the user space as a mapped data file, retrieves a set of physical addresses of the plurality of physical addresses corresponding to the set of virtual addresses from the page table, and stores the set of physical addresses in to the set of meta-buffers. The network interface device retrieves the data file from the kernel space based on the set of physical addresses and transmits the data file. In one example, the network interface device includes a direct memory access (DMA) system.

The DMA system retrieves the set of physical addresses from the meta-buffers and further retrieves the data file from the kernel space based on the set of physical addresses. The DMA system further transmits the data file to a network interface port. The network interface port transmits the data file to a client device. Hence, during the transmission of the data file, the data file is not copied in to the user space, thereby reducing a number of processing cycles required by the processor in the transmission of the data file. Therefore, the data transmission system provides a zero-copy method for transmitting the data file and improves the performance of the processor. Further, the processor does not require to transition from the user mode to a kernel mode while transmitting the data file. Hence, the number of processing cycles required by the processor for transitioning between the user and kernel modes is reduced, thereby improving the efficiency of the processor.

Figure 4:
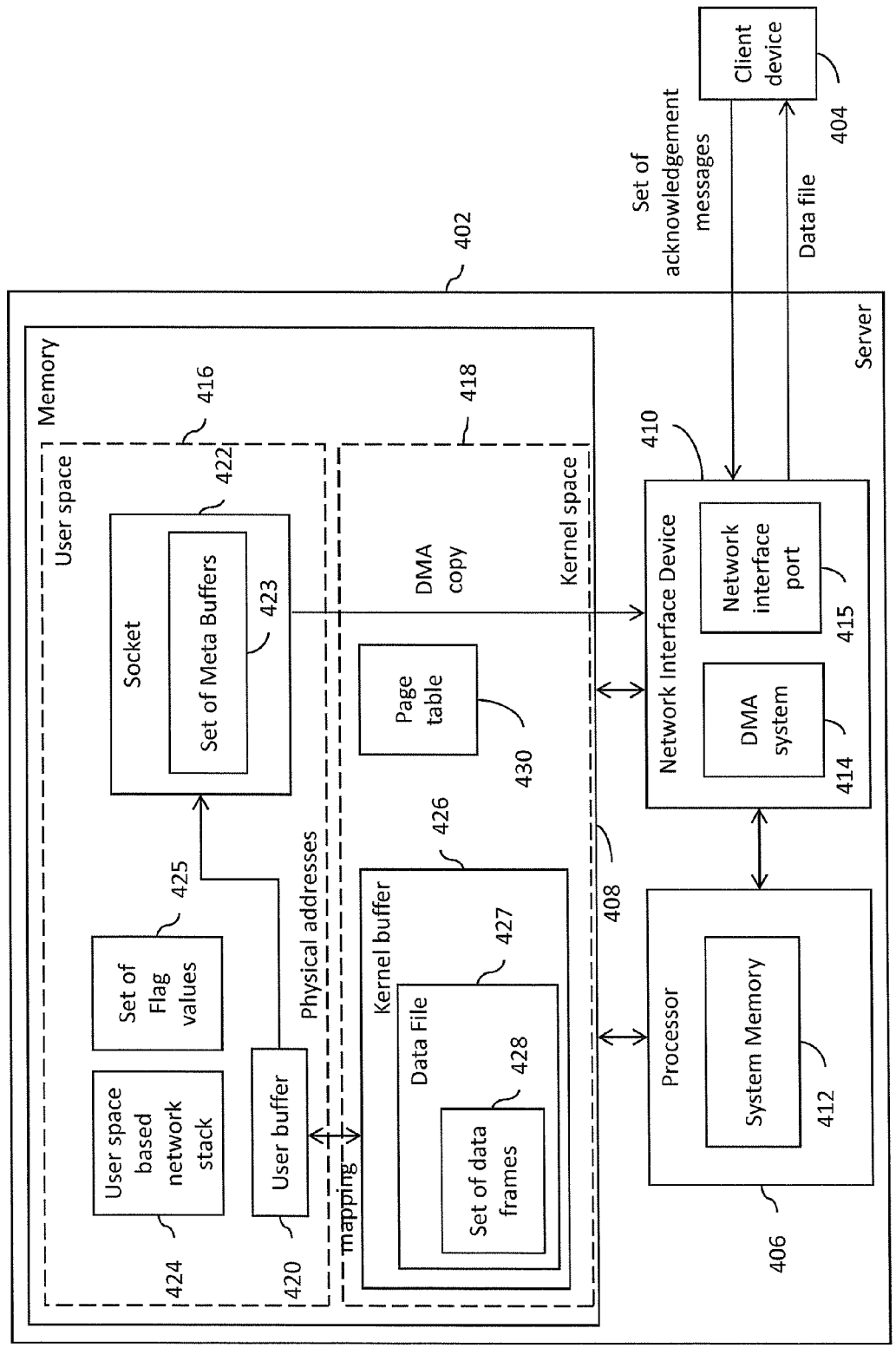
FIG. 4 is a schematic block diagram of a server for transmitting multiple data files to a client device in accordance with an embodiment of the present invention.

Referring now to FIG. 4, a schematic block diagram of a server 402 for transmitting multiple data files to a client device 404 is shown in accordance with an embodiment of the present invention. The server 402 is connected to the client device 404. The server 402 and the client device 404 are included in a computer network (not shown). The computer network includes multiple servers (not shown) including the server 402 and multiple client devices (not shown) including the client device 404.

The server 402 (also referred to as a data transmission system) includes a processor 406, a memory 408, and a network interface device 410. The processor 406 includes a system memory 412. The network interface device 410 includes a direct memory access (DMA) system 414 and a network interface port 415. The memory 408 includes a user space 416 and a kernel space 418. The user space 416 includes a user buffer 420, a socket 422 that includes a set of meta-buffers 423, a user space based network stack 424, and a set of flag values 425. The kernel space 418 includes a kernel buffer 426 that includes a data file 427. The data file 427 includes a set of data frames 428. The kernel space 418 further includes a page table 430.

The server 402 includes an internal memory (not shown) that stores a boot code for booting a server OS, examples of which include Linux©, Windows©, and Macintosh© OSs. In a preferred embodiment of the present invention, the server 402 operates on the Linux© OS. The server 402 stores the data files (not shown) including the data file 427 that contains information to be shared with the client devices. The server OS enables execution of multiple user processes. The user processes provide multiple services to the client device 404 connected to the server 402. Examples of such services include a file transfer service for transmitting the data files, an electronic mail (e-mail) service, and a web browsing service. The server 402 shares the data files with the client device 404 on receiving a transmission request from the client device 404.

The client device 404 includes at least one of, but is not limited to, a personal computer, a portable computer, a tablet and a handheld device. The client device 404 sends the transmission request to the server 402 for transmitting the data file 427.

The memory 408 is connected to the processor 406 and the network interface device 410. The memory 408 is a physical memory that includes multiple memory locations. In one example, the memory 408 is a random access memory (RAM) such as a dynamic random access memory (DRAM) or a static random access memory (SRAM). In another example, the memory 408 is an external storage device. The memory locations are associated with multiple physical addresses. The memory 408 further includes the user space 416 and the kernel space 418. In one example, the server 402 uses a virtual memory (not shown) that includes the user space 416 and the kernel space 418. The virtual memory includes multiple virtual addresses associated with corresponding physical addresses.

The user space 416 includes a first set of memory locations of the multiple memory locations of the memory 408. The user space 416 is reserved for executing the user processes. The user space 416 includes the user buffer 420 and the socket 422. The socket 422 is a network socket that functions as an endpoint in a network connection. In one example, the socket 422 is at least one of, but not limited to, a transmission control protocol (TCP) socket and an internet protocol (IP) socket. In one example, the user space 416 stores multiple sockets (not shown) including the socket 422. The multiple sockets correspond to the multiple user processes running on the server 402. A subset of the set of meta-buffers 423 that are used for storing the data files to be transmitted from the server 402 to the client device 404 are referred to as transmission meta-buffers. Another subset of the set of meta-buffers 423 that are used for storing the data files that are received from the computer network are referred to as reception meta-buffers. In one example, the reception meta-buffers store a set of acknowledgement messages received from the client device 404.

The user space based network stack 424 includes a set of instructions. In one example, the user space based network stack 424 includes at least one of, but not limited to, a user space based TCP stack (USTCP) and a user space based IP stack (USIP). The set of instructions includes a method of transmitting the data file 427 to the client device 404. In another example, the set of instructions includes definition of a modified SENDFILE system call which includes the method of transmitting the data file 427 to the client device 404. The modified SENDFILE system call requires at least three input parameters that include a virtual address of the socket 422, the virtual address of the data file 427, and a length of the data file 427. The modified SENDFILE system call enables transmission of the data file 427 to the client device 404 based on the input parameters. Thus, the modified SENDFILE system call does not create multiple copies of the data file 427 in to the user space 416, thereby reducing the processing cycles required by the processor 406. In another example, the set of instructions are a part of a computer readable program coded in a computer readable programming language such as C, C++, or C#. The processor 406 executes the method of transmitting the data file 427 to the client device 404 that is defined in the user space based network stack 424 while executing the modified SENDFILE system call. In another example, the modified SENDFILE system call defined in the user space based network stack 424 overrides an existing SENDFILE system call within the server 402.

The kernel space 418 includes a second set of memory locations of the multiple memory locations of the memory 408. The kernel space 418 is reserved for running kernel services and system calls. The kernel space 418 includes the kernel buffer 426. In an example, the kernel space 418 further stores the data files. The page table 430 stores a mapping between the virtual addresses and corresponding physical addresses. In an example, the kernel space 418 further stores multiple process page tables corresponding to multiple user processes being executed on the server 402. Thus, the page table 430 is a process page table 430 stored in a process kernel space (not shown) of a user process. The process page table 430 includes the mapping between a set of virtual addresses corresponding to the user process and corresponding set of physical addresses thereof. The processor 406 utilizes the process page table 430 to determine the set of physical addresses corresponding to the set of virtual addresses. In an example, the kernel space 418 stores the data file 427 in the kernel buffer 426. The data file 427 includes the set of data frames 428 stored at the set of physical addresses corresponding to the data file 427.

The processor 406 is connected to the memory 408 and the network interface device 410. The processor 406 includes the system memory 412. In an example, the system memory 412 is at least one of a cache memory and a random access memory (RAM). The processor 406 executes the set of instructions stored in the user space based network stack 424. When the processor 406 executes the kernel services and the system calls, the processor 406 is in a kernel mode. When the processor 406 executes the user processes, the processor 406 is in a user mode.

Initially, the processor 406 operates in the user mode and executes the user process such as a file transfer service. The processor 406 receives the transmission request corresponding to the data file 427 from the client device 404. The processor 406 checks to determine whether the data file 427 is stored in the kernel space 418. The processor 406 then identifies the data file 427 from the multiple data files stored in the kernel space 418 and stores the data file 427 in the kernel buffer 426. In one embodiment, the processor 406 identifies the data file 427 stored in a secondary memory (not shown) and retrieves the data file 427 from the secondary memory to the kernel buffer 426.

The processor 406 then generates the modified SENDFILE system call to transmit the data file 427 to the client device 404. When the processor 406 executes the modified SENDFILE system call, the processor 406 determines the set of virtual addresses corresponding to the data file 427 and stores the set of virtual addresses in the user buffer 420 as a mapped data file, thereby mapping the data file 427. In one embodiment, the processor 406 maps the data file 427 in to a virtual address space of the user process running on the server 402 by executing a memory map system call (also referred to as an MMAP system call).

The processor 406 reads the process page table 430 to determine the set of physical addresses corresponding to the set of virtual addresses. The processor 406 determines a page size of the kernel space 418. The processor 406 creates the socket 422 that includes the set of meta-buffers 423 based on the page size of the kernel space 418. In one embodiment, a page size granularity of the kernel space 418 is utilized for creating the set of meta-buffers 423, i.e., a minimum size of each meta-buffer of the set of meta-buffers 423 is equal to the page size of the kernel space 418. The processor 406 stores the set of physical addresses in the set of meta-buffers 423. Each meta-buffer of the set of meta-buffers 423 stores a physical address corresponding to a data frame of the set of data frames 428, thereby associating corresponding meta-buffer of the set of meta-buffers 423 with the data frame of the set of data frames 428.

The processor 406 stores the set of flag values 425 in to the user space 416. Each flag value of the set of flag values 425 corresponds to a meta-buffer of the set of meta-buffers 423. Hence, a flag value of the set of flag values 425 (hereinafter referred to as the flag value 425) is indicative of a position of the meta-buffer of the set of meta-buffers 423 (hereinafter referred to as the meta-buffer 423) within the set of meta-buffers 423 in the socket 422. In one embodiment, the flag value 425 is logic high value for the meta-buffer 423 corresponding to a last data frame of the set of data frames 428 within the data file 427 and is logic low value for other meta-buffers of the set of meta-buffers 423. Subsequent to the transmission of the data file 427, the processor 406 receives the set of acknowledgement messages corresponding to the set of meta-buffers 423. An acknowledgement message corresponding to the meta-buffer 423 is indicative of reception of the data frame of the set of data frames 428 corresponding to the meta-buffer 423 at the client device 404. The processor 406 checks to determine the flag value 425 of the meta-buffer 423 corresponding to a received acknowledgement message. If the flag value 425 is high, the processor 406 determines that the last data frame of the set of data frames 428 has been transmitted and subsequently deletes the mapped data file from the user buffer 420 stored in the user space 416, thereby releasing the set of virtual addresses corresponding to a set of memory locations allocated to the mapped data file.

The network interface device 410 is connected to the processor 406, the memory 408, and the client device 404. In one embodiment, the network interface device 410 is a network interface card (NIC). The network interface device 410 includes the DMA system 414 and the network interface port 415. The network interface port 415 is connected to the client device 404. In an example, the network interface port 415 is an Ethernet port. The DMA system 414 retrieves the set of physical addresses from the set of meta-buffers 423 of the socket 422. The DMA system 414 further retrieves the data file 427 from the kernel buffer 426 stored in the kernel space 418 based on the set of physical addresses. Subsequently, the DMA system 414 transmits the data file 427 to the network interface port 415. The network interface port 415 transmits the data file 427 to the client device 404 and receives the set of acknowledgement messages.

In operation, the server 402 receives the transmission request from the client device 404 for transmitting the data file 427 to the client device 404. The processor 406 identifies and stores the data file 427 to the kernel buffer 426 in the kernel space 418. The processor 406 generates the modified SENDFILE system call for transmitting the data file 427 to the client device 404. When the processor 406 executes the modified SENDFILE system call, the processor 406 determines the set of virtual addresses corresponding to the data file 427 and stores the set of virtual addresses in the user buffer 420 as the mapped data file. In one example, the processor 406 determines the set of virtual addresses corresponding to the data file 427 and stores the set of virtual addresses in the user buffer 420 by executing the MMAP system call. The processor 406 retrieves the set of physical addresses corresponding to the set of virtual addresses from the process page table 430. The processor 406 creates the socket 422 that includes the set of meta-buffers 423. The processor 406 stores the set of physical addresses in to the set of meta-buffers 423. The processor 406 stores the set of flag values 425 corresponding to the set of meta-buffers 423 in the user space 416.

The DMA system 414 retrieves the set of physical addresses from the set of meta-buffers 423. The DMA system 414 further retrieves the data file 427 from the kernel buffer 426 stored in the kernel space 418 based on the set of physical addresses. The DMA system 414 transmits the data file 427 to the network interface port 415. The network interface port 415 transmits the data file 427 to the client device 404. The server 402 receives the set of acknowledgement messages from the client device 404. The processor 406 checks to determine the flag value 425 corresponding to the received acknowledgement message. If the flag value 425 is logic high value, the processor 406 deletes the mapped data file from the user buffer 420 stored in the user space 416.

Hence, the data file 427 is not copied to the user space 416 during the transmission of the data file 427 from the server 402 to the client device 404. The server 402 transmits the data file 427 to the client device 404 without creating multiple copies of the data file 427 in the user space 416, thereby reducing a number of processing cycles required to transmit the data file 427, and also reducing the amount of memory used. Further, since the user space based network stack 424 is stored in the user space 416, the processor 406 does not transition between the user and kernel modes when the processor 406 executes the set of instructions in the user space based network stack 424, thereby further reducing the processing cycles used. Hence, the processor 406 performs a zero-copy transmission of the data file 427 in the user space 416, thereby improving the performance of the server 402. Therefore, the transmission is referred to as a zero-copy transmission of the data file 427. The modified SENDFILE system call is referred to as a zero-copy SENDFILE system call and the server 402 is a zero-copy data transmission system.

Figure 5:
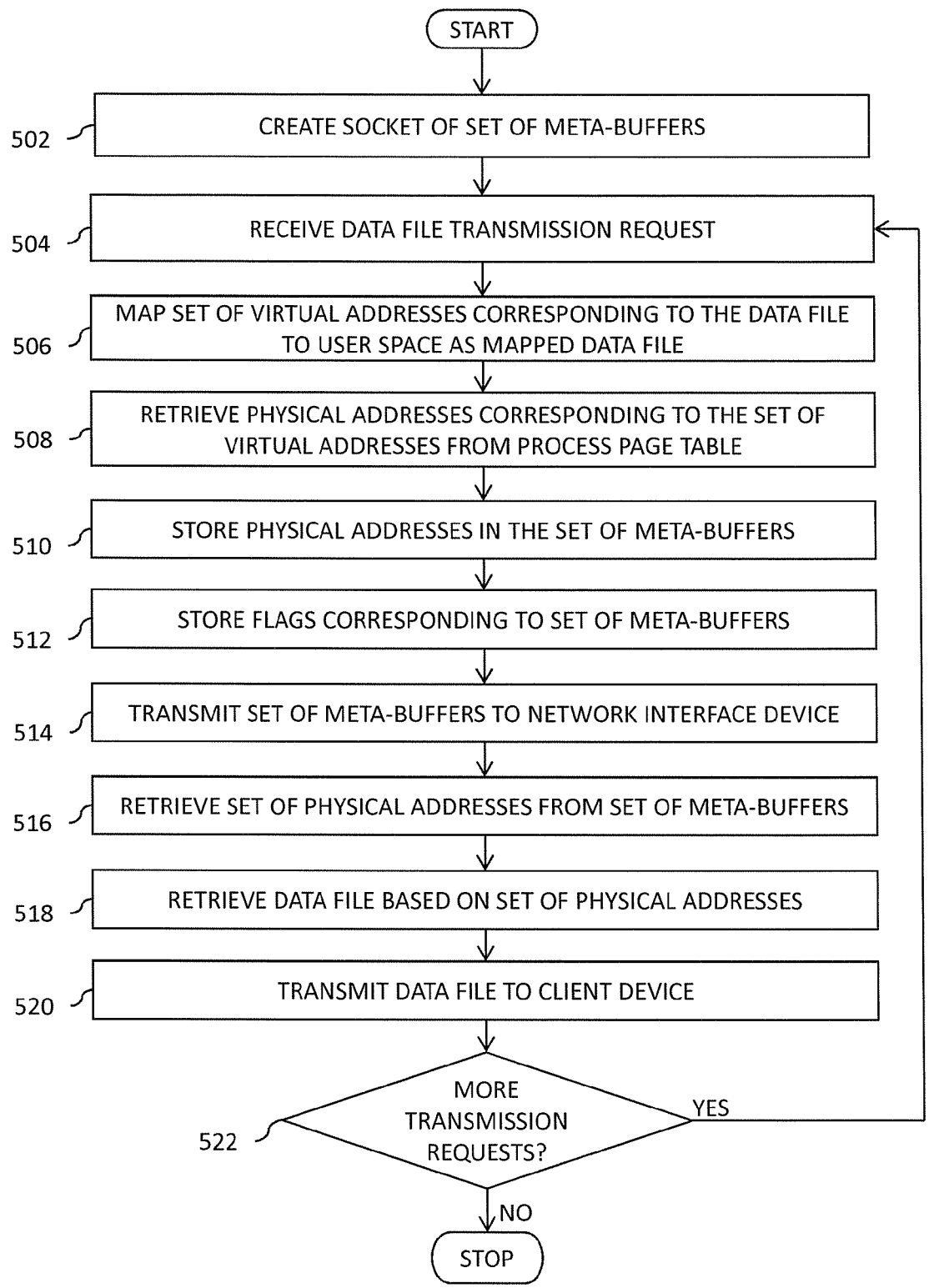
FIG. 5 is a flowchart illustrating a method for transmitting a data file in a computer network in accordance with an embodiment of the present invention.

Referring now to FIG. 5, a flow chart illustrating a method for transmitting the data file 427 in the computer network in accordance with an embodiment of the present invention is shown. The flow chart is explained below with reference to the server 402 of FIG. 4.

At step 502, the processor 406 creates the socket 422 in the user space 416. The socket 422 includes the set of meta-buffers 423. At step 504, the server 402 receives the transmission request from the client device 404 for transmitting the data file 427 and generates the modified SENDFILE system call. At step 506, the processor 406 maps the set of virtual addresses corresponding to the data file 427 to the user space 416 as the mapped data file. In one example, the processor 406 maps the set of virtual addresses corresponding to the data file 427 to the user space 416 by executing the MMAP system call. The mapped data file is stored in the user buffer 420. At step 508, the processor 406 retrieves the set of physical addresses corresponding to the set of virtual addresses from the process page table 430. At step 510, the processor 406 stores the set of physical addresses in the set of meta-buffers 423. At step 512, the processor 406 stores the set of flag values 425 corresponding to the meta-buffers 423 in the user space 416. At step 514, the processor 406 transmits the set of meta-buffers 423 to the network interface device 410. At step 516, the DMA system 414 retrieves the set of physical addresses from the set of meta-buffers 423. At step 518, the DMA system 414 retrieves the data file 427 from the kernel buffer 426 stored in the kernel space 418 based on the set of physical addresses. At step 520, the DMA system 414 transmits the data file 427 to the network interface port 415, whereby the network interface port 415 transmits the data file 427 to the client device 404.

At step 522, the processor 406 checks to determine whether there are any more transmission requests. If at step 522, the processor 406 determines that there are more transmission requests, then the processor 406 executes step 504.

Figure 6:
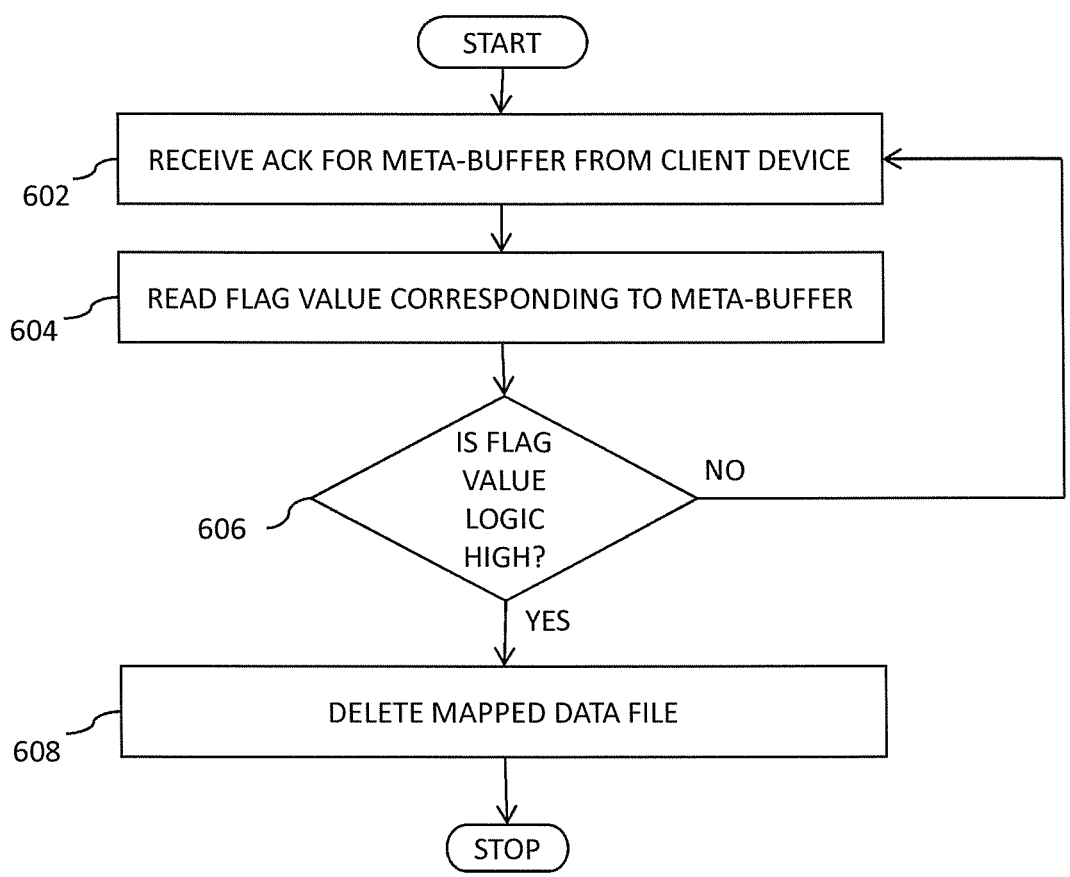
FIG. 6 is a flowchart illustrating a method for deleting a mapped data file in accordance with an embodiment of the present invention.

Referring now to FIG. 6, a flow chart illustrating a method for deleting the mapped data file in accordance with an embodiment of the present invention is shown. The flow chart is explained below with reference to the server 402 of FIG. 4.

At step 602, the server 402 receives an acknowledgement message for the meta-buffer 423 from the client device 404. At step 604, the processor 406 reads the flag value 425 corresponding to the meta-buffer 423. At step 606, the processor 406 checks to determine whether the flag value 425 to determine whether the meta-buffer 423 is the last meta-buffer within the set of meta-buffers 423 of the socket 422 (e.g., the flag is set). If at step 606, the processor 406 determines that the flag 425 is not set, i.e., the meta-buffer 423 is not the last meta-buffer within the set of meta-buffers 423 of the socket 422, then the processor 406 executes step 602. However, if at step 606, the processor 406 determines that the flag value 425 is set, i.e., the meta-buffer 423 is the last meta-buffer within the set of meta-buffers 423 of the socket 422, then the processor 406 executes step 608. At step 608, the processor 406 deletes the mapped data file stored in the user buffer 420 in the user space 416.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A data transmission system, comprising:
a memory comprising a plurality of memory locations each having a corresponding physical address associated therewith, wherein the memory further includes:
a kernel space for storing a plurality of data files and a page table, wherein the page table includes a mapping between a plurality of virtual addresses and corresponding physical addresses; and
a user space;
a processor in communication with the memory and configured for:
creating a socket in the user space, wherein the socket includes a set of meta-buffers,
receiving a data file transmission request,
mapping a set of the virtual addresses corresponding to the data file to the user space as a mapped data file,
retrieving a set of the physical addresses that correspond to the set of virtual addresses from the page table, and
storing the set of physical addresses in the meta-buffers; and
a network interface device, connected to the processor and the memory, for retrieving the set of physical addresses from the meta-buffers, retrieving the data file from the kernel space using the set of physical addresses, and transmitting the data file to a client device.

2. The data transmission system of claim 1, wherein the processor further stores a set of flag values corresponding to the meta-buffers in the user space, and wherein each flag value indicates a position of a corresponding one of the meta-buffers.

3. The data transmission system of claim 2, wherein the data file includes a set of data frames, each data frame being stored at a corresponding one of the physical addresses, thereby associating each meta-buffer with a corresponding one of the data frames.

4. The data transmission system of claim 3, wherein the processor further performs the steps of:
receiving a set of acknowledgement messages corresponding to the set of meta-buffers, wherein the acknowledgement messages indicate reception of the data frames corresponding to the meta-buffers at the client device, and
deleting the mapped data file from the user space based on the flag values and the acknowledgement messages.

5. The data transmission system of claim 4, wherein the network interface device includes:
a direct memory access (DMA) system, connected to the processor and the memory, for retrieving the set of physical addresses from the meta-buffers and retrieving the data file from the kernel space based on the set of physical addresses; and
a network interface port connected to the DMA system and a communication network that includes the client device, wherein the network interface port transmits the data file to the client device and receives the set of acknowledgement messages corresponding to the data file.

6. The data transmission system of claim 5, wherein the processor creates the socket by reading a page size of the kernel space and generates the meta-buffers based on the page size and the page table.

7. The data transmission system of claim 6, wherein the user space has a user space based network stack that includes a plurality of instructions.

8. The data transmission system of claim 7, wherein the processor executes the plurality of instructions to transmit the data file.

9. The data transmission system of claim 8, wherein the kernel space comprises a first set of the plurality of memory locations that store the data files and the page table, and wherein the user space comprises a second set of the plurality of memory locations that store the plurality of instructions, the mapped data file, the socket, the set of flag values, and the user space based network stack.

10. A method for transmitting a plurality of data files in a data transmission system that includes a memory, a processor, and a network interface device, wherein the memory includes a plurality of memory locations having a plurality of physical addresses associated therewith, and wherein the memory further includes a kernel space for storing the plurality of data files and a page table, and a user space, the method comprising:
creating a socket in the user space, wherein the socket includes a set of meta-buffers;
receiving a transmission request for transmitting a data file of the plurality of data files;
mapping a set of the plurality of virtual addresses corresponding to the data file to the user space as a mapped data file;
retrieving a set of the plurality of physical addresses corresponding to the set of virtual addresses from the page table, wherein the page table includes a mapping between the virtual addresses and the physical addresses;
storing the set of physical addresses in the set of meta-buffers;
retrieving the set of physical addresses from the set of meta-buffers;
retrieving the data file from the kernel space based on the set of physical addresses; and
transmitting the data file to a client device.

11. The method of claim 10, further comprising storing a set of flag values corresponding to the set of meta-buffers in the user space, wherein each flag value indicates a position of a corresponding one of the meta-buffers.

12. The method of claim 11, wherein the data file includes a set of data frames, each data frame being stored at a corresponding physical address, thereby associating the meta-buffers with corresponding data frames.

13. The method of claim 12, further comprising:
receiving a set of acknowledgement messages corresponding to the set of meta-buffers, wherein the set of acknowledgement messages indicate reception of the set of data frames corresponding to the set of meta-buffers at the client device; and
deleting the mapped data file from the user space based on the set of flag values and the set of acknowledgement messages.

14. The method of claim 13, further comprising reading a page size of the kernel space and generating the set of meta-buffers based on the page size and the page table.

15. The method of claim 14, wherein the user space includes a user space based network stack that includes a plurality of instructions.

16. The method of claim 15, wherein the processor executes the instructions to transmit the data file.

17. The method of claim 16, wherein the kernel space comprises a first set of the plurality of memory locations that store the plurality of data files and the page table, and the user space comprises a second set of the plurality of memory locations that store the plurality of instructions, the mapped data file, the socket, the set of flag values, and the user space based network stack.

\* \* \* \* \*